US011296882B1

(12) United States Patent
Singh et al.

(10) Patent No.: US 11,296,882 B1
(45) Date of Patent: Apr. 5, 2022

(54) SYSTEM FOR INTELLIGENT IDENTIFICATION OF UNAUTHORIZED USERS IN A DISTRIBUTED REGISTER NETWORK

(71) Applicant: BANK OF AMERICA CORPORATION, Charlotte, NC (US)

(72) Inventors: Shailendra Singh, Maharashtra (IN); Nimish Ravindra Deshpande, Maharashtra (IN); Prashant Khare, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 78 days.

(21) Appl. No.: 17/060,312

(22) Filed: Oct. 1, 2020

(51) Int. Cl.
*H04L 29/06* (2006.01)
*H04L 9/32* (2006.01)
*H04L 9/06* (2006.01)

(52) U.S. Cl.
CPC .......... *H04L 9/3213* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 10,498,808 B2* | 12/2019 | Purushothaman | ... | G06K 7/1413 |
| 10,693,646 B2* | 6/2020 | Kurian | ..................... | H04L 9/321 |
| 10,839,386 B2* | 11/2020 | Kamalsky | .............. | G06Q 40/08 |
| 10,944,745 B2* | 3/2021 | Kursun | .................. | H04L 9/0894 |
| 10,949,511 B2* | 3/2021 | Frederick | ................ | G06F 16/27 |
| 11,128,442 B1* | 9/2021 | Deshpande | ........... | H04L 9/0618 |
| 11,165,754 B2* | 11/2021 | Pattanaik | ............ | H04L 63/0428 |
| 11,165,787 B2* | 11/2021 | Sloane | .................. | H04L 9/3239 |
| 2021/0073913 A1* | 3/2021 | Ingargiola | .......... | G06Q 20/3676 |
| 2022/0012731 A1* | 1/2022 | DeRosa-Grund | ............................ | G06Q 20/40145 |
| 2022/0038259 A1* | 2/2022 | Fazzone | ................ | H04W 12/06 |

* cited by examiner

*Primary Examiner* — Jeffery L Williams
(74) *Attorney, Agent, or Firm* — Moore & Van Allen PLLC; Nicholas C. Russell

(57) ABSTRACT

A system for identifying unauthorized users in a distributed register network is provided. In particular, the system may comprise a distributed register network comprising one or more decentralized nodes, each of which may store a separate copy of a distributed data register. The system may further comprise one or more specialized nodes which authenticate users that trigger the generation of blocks in a linked structures of the distributed register network, where the blocks are associated with requests that are submitted by the user. In this way, the system verifies the authenticity of the blocks in the linked structures, thereby providing a more robust distributed register network.

20 Claims, 3 Drawing Sheets

SYSTEM FOR INTELLIGENT IDENTIFICATION OF UNAUTHORIZED USERS IN A DISTRIBUTED REGISTER NETWORK

BACKGROUND

There is a need for an efficient and secure way to perform user authentication in a distributed register network.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for identifying unauthorized users in a distributed register network. In particular, the system may comprise a distributed register network comprising one or more decentralized nodes, each of which may store a separate copy of a distributed data register.

Accordingly, embodiments of the present disclosure provide a system for identifying unauthorized users in a distributed register network. The system may comprise a memory device with computer-readable program code stored thereon; a communication device; and a processing device operatively coupled to the memory device and the communication device. The processing device may be configured to execute the computer-readable program code to receive a request from a user, via a user interface, in response to receiving the request from the user, trigger creation of a block in a linked structure of a distributed register network, generate an original token using a cryptographic hash algorithm, transmit the original token to the user, perform first level of authentication of the user based on the original token, determine that the first level of authentication is successful and perform a second level of authentication, wherein the second level of authentication comprises identifying real-time information associated with the user and comparing the real-time information of the user with user information stored in a data file associated with the user, determine that the second level of authentication is successful, in response to determining that the second level of authentication is successful, mark the block as an active block, and perform verification of the block with other nodes of the distributed register network.

In some embodiments, the processing device may be configured to execute the computer-readable program code to determine that at least one of the first level of authentication and the second level of authentication is unsuccessful, mark the block as a passive block based on determining that the first level of authentication or the second level of authentication is unsuccessful, and in response to marking the block as the passive block, transfer a hash of the block to the other nodes of the distributed register network.

In some embodiments, authenticating the user comprises receiving a user token from the user, via the user interface and comparing the user token with the original token to determine a match between the user token and the original token.

In some embodiments, the processing device is further configured to execute the computer-readable program code to store the original token and the user token in the block.

In some embodiments, the request is received from a node of the distributed register network.

In some embodiments, the cryptographic hash algorithm is SHA-1 algorithm.

In some embodiments, the original token is a single use token.

In some embodiments, the user information in the data file is extracted from one or more data sources comprising at least one of historical distributed register networks, historical block in the distributed register network, internal private networking platform, and Internet of Things (IoT) devices.

In some embodiments, determining that the second level of authentication is successful is based on generating an authentication score based on comparing the real-time information of the user with user information stored in the data file and determining that the authentication score meet a threshold limit.

Embodiments of the present disclosure also provide a computer program product for identifying unauthorized users in a distributed register network. The computer program product may comprise at least one non-transitory computer readable medium having computer-readable program code portions embodied therein, the computer-readable program code portions comprising executable portions for receiving a request from a user, via a user interface, in response to receiving the request from the user, triggering creation of a block in a linked structure of a distributed register network, generating an original token using a cryptographic hash algorithm, transmitting the original token to the user, performing first level of authentication of the user based on the original token, determining that the first level of authentication is successful and perform a second level of authentication, wherein the second level of authentication comprises identifying real-time information associated with the user and comparing the real-time information of the user with user information stored in a data file associated with the user, determining that the second level of authentication is successful, in response to determining that the second level of authentication is successful, marking the block as an active block, and performing verification of the block with other nodes of the distributed register network.

In some embodiments, the computer-readable program code portions comprising executable portions for determining that at least one of the first level of authentication and the second level of authentication is unsuccessful, marking the block as a passive block based on determining that the first level of authentication or the second level of authentication is unsuccessful, and in response to marking the block as the passive block, transferring a hash of the block to the other nodes of the distributed register network.

In some embodiments, authenticating the user comprises receiving a user token from the user, via the user interface and comparing the user token with the original token to determine a match between the user token and the original token.

In some embodiments, the computer-readable program code portions comprising executable portions for storing the original token and the user token in the block.

Embodiments of the present disclosure also provide a computer-implemented method for identifying unauthorized users in a distributed register network. The method comprises receiving a request from a user, via a user interface, in response to receiving the request from the user, triggering creation of a block in a linked structure of a distributed register network, generating an original token using a cryptographic hash algorithm, transmitting the original token to the user, performing first level of authentication of the user based on the original token, determining that the first level of authentication is successful and perform a second level of authentication, wherein the second level of authentication comprises identifying real-time information associated with the user and comparing the real-time information of the user with user information stored in a data file associated with the user, determining that the second level of authentication is successful, in response to determining that the second level of authentication is successful, marking the block as an active block, and performing verification of the block with other nodes of the distributed register network.

In some embodiments, the method further comprises determining that at least one of the first level of authentication and the second level of authentication is unsuccessful, marking the block as a passive block based on determining that the first level of authentication or the second level of authentication is unsuccessful, and in response to marking the block as the passive block, transferring a hash of the block to the other nodes of the distributed register network.

In some embodiments, authenticating the user comprises receiving a user token from the user, via the user interface and comparing the user token with the original token to determine a match between the user token and the original token.

In some embodiments, the method further comprises storing the original token and the user token in the block.

In some embodiments, the request is received from a node of the distributed register network.

In some embodiments, the cryptographic hash algorithm is SHA-1 algorithm.

In some embodiments, the original token is a single use token.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
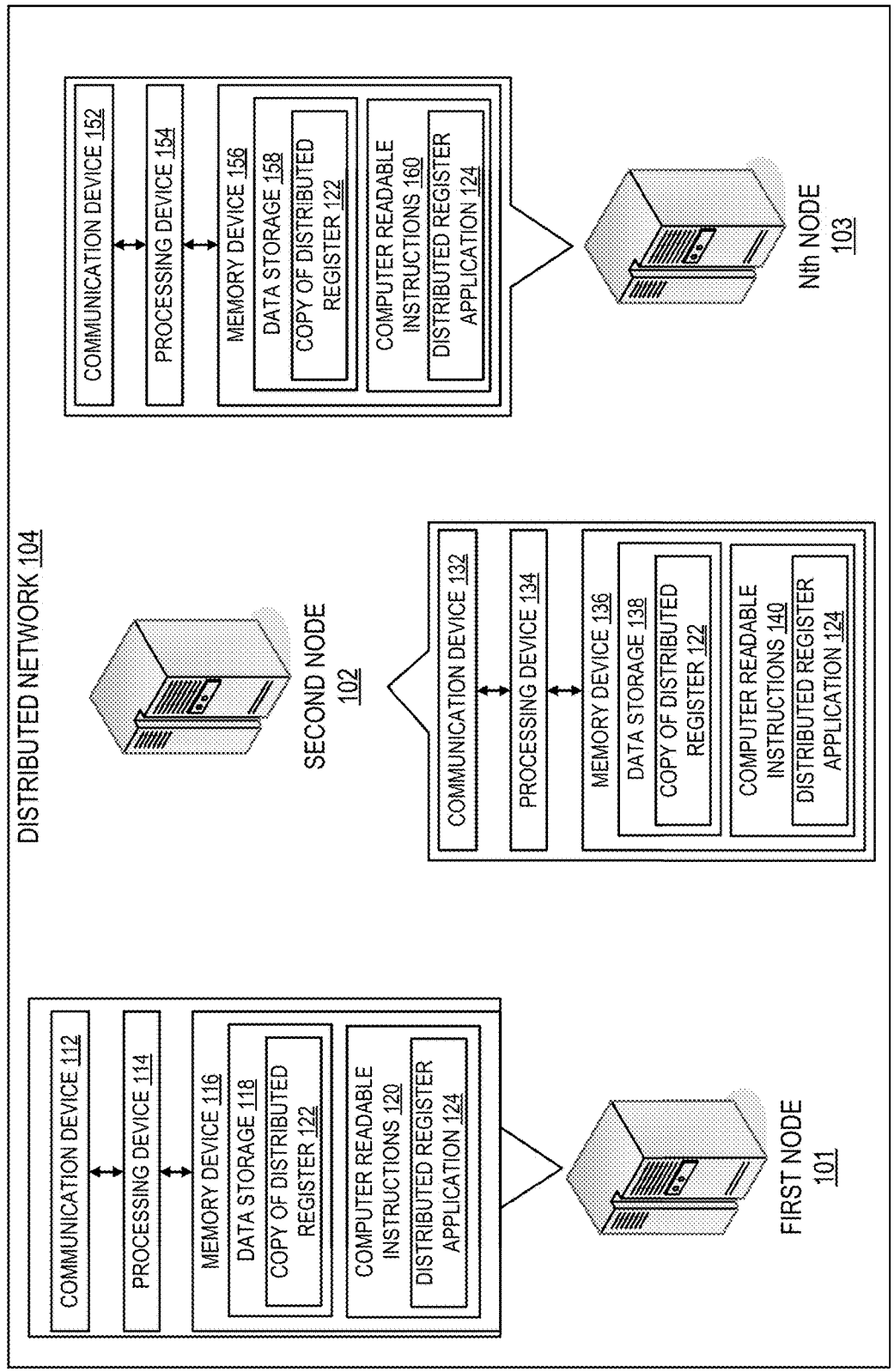
Figure 2:
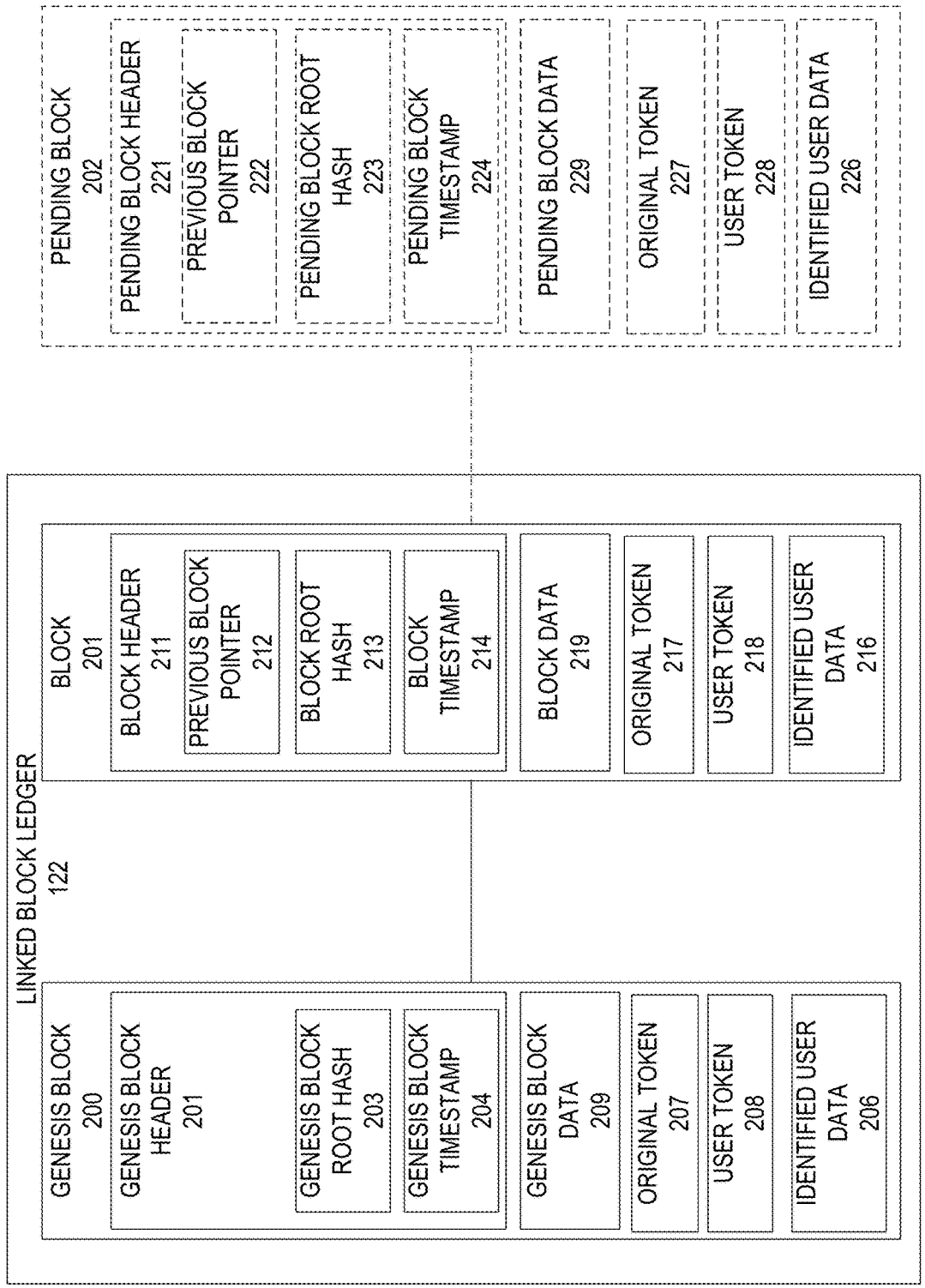
Figure 3:
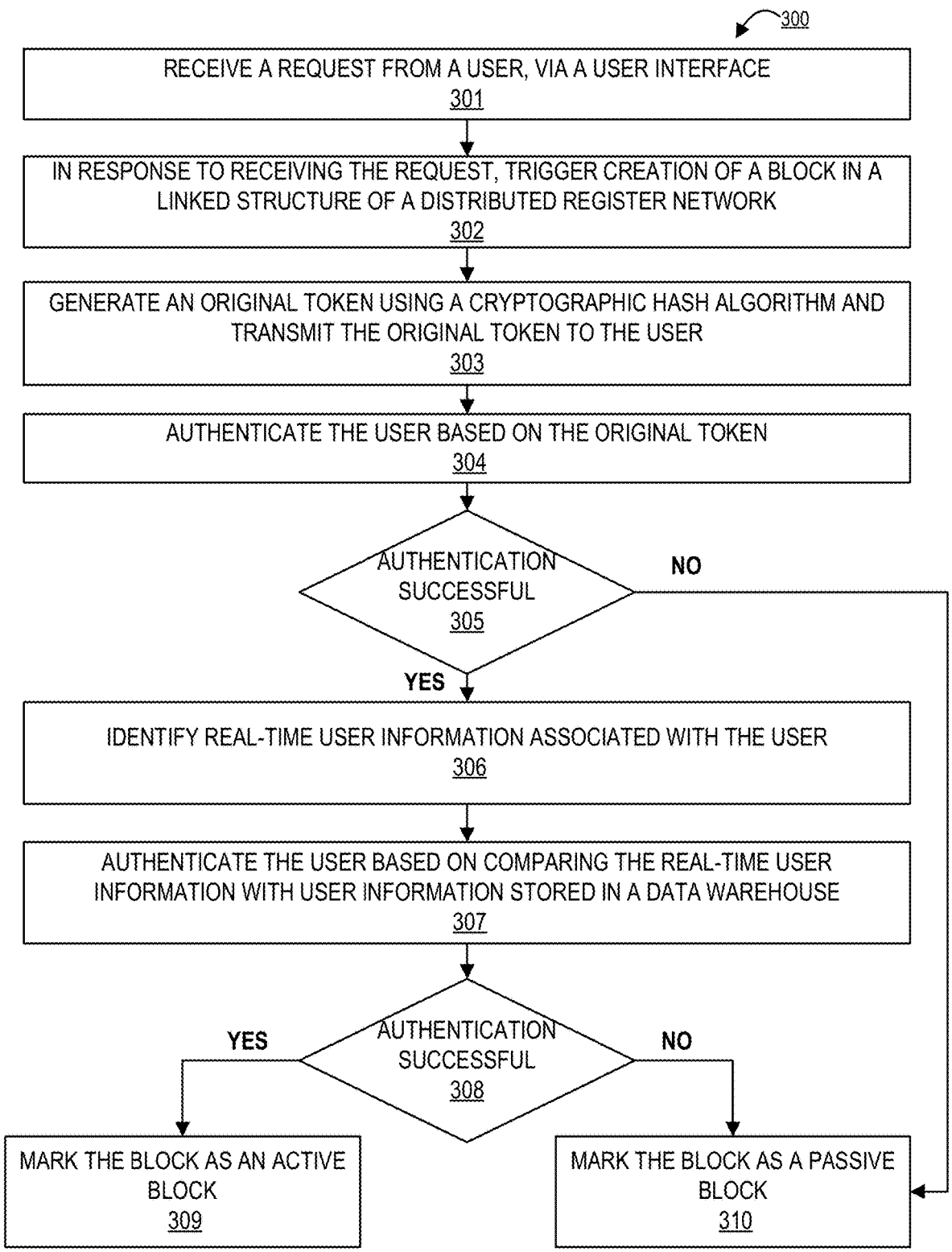

Having thus described embodiments of the invention in general terms, reference will now be made to the accompanying drawings, wherein:

FIG. 1 illustrates an operating environment for user authenticated distributed register system of the present invention, in accordance with one embodiment of the present disclosure;

FIG. 2 is a block diagram illustrating the data structures within an exemplary distributed register that are generated by the system of the present invention, in accordance with one embodiment of the present disclosure; and FIG. 3 is a flow diagram illustrating a process for authenticating users associated with blocks created in a distributed register, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," "linked structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, a pointer (e.g., a hash value) to the previous block in the linked block structure, and/or any additional data created by the system of the present invention. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified. In some embodiments of the present invention, a user may submit data associated with the creation of a new block associated with the linked block structure. For example, a user may initiate a transaction, where the data associated with the transaction is stored in a new block linked with the transaction.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed ledger" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed ledger" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm. In some embodiments of the present invention, the distributed ledger being described herein may be a permissioned distributed ledger. In some embodiments of the present invention, the distributed ledger being described herein may be a private distributed ledger.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

While distributed ledgers provide a secure way to perform transactions and/or save data and ensure that the data within the blocks is not modified, existing conventional systems do not verify the authenticity of the blocks. Typically, existing systems create blocks within the distributed register network. However, existing systems do not perform authentication associated with the creation of blocks. In other words, the existing systems do not verify the authenticity of the user associated with creation of a block. As such, there is no way to determine whether a block within the distributed register network is legit or not. There exists a need for a system within the distributed ledger, that performs authentication associated with the blocks that are being created. The system of the present invention utilizes a cryptographic hash algorithm (e.g., SHA-1 algorithm) and also data from different data sources to authenticate users associated with creation of blocks, thereby building a more robust distributed register network.

Turning now to the figures, FIG. 1 illustrates an operating environment 100 for the user authenticated distributed register system, in accordance with one embodiment of the present disclosure. In particular, FIG. 1 illustrates a first node 101, a second node 102, and an $n^{th}$ node 103 within a distributed network 104, where each of the nodes 101, 102, 103 host a copy of a distributed register 122, as will be described in further detail below. The nodes 101, 102, 103 within the distributed network 104 may be communicatively coupled with one another such that the nodes may send data to and receive data from the other nodes within the distributed network 104. It should be understood that FIG. 1 illustrates only an exemplary embodiment of the operating environment 100, and it will be appreciated that one or more functions of the systems, devices, or servers as depicted in FIG. 1 may be combined into a single system, device, or server and/or performed by other computing systems. Furthermore, a single system, device, or server as depicted in FIG. 1 may represent multiple systems, devices, or servers. For instance, though FIG. 1 depicts three nodes 101, 102, 103, the operating environment may comprise a fewer or greater number of nodes according to the implementation of the system described herein.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the first node 101 may be a part of the distributed network 104. In some embodiments, the first node may be an authentication engine of the present invention and may perform authentication of users associated with creating new blocks. For example, when a user initiates a transaction, the first node automatically initiates the authentication of the user and verifies that the block associated with the transaction is authentic. In some embodiments, the first block may be responsible for creating a block in a linked structure and may also be responsible for authenticating the user who is involved with the creation of the block. In this regard, the first node 101 may be, for example, a networked terminal, server, desktop computer, or the like, though it is within the scope of the disclosure for the first node 101 to be a portable device such as a cellular phone, smart phone, smart device, personal data assistant (PDA), laptop, or the like. The first node 101 may comprise a communication device 112, a processing device 114, and a memory device 116, where the processing device 114 is operatively coupled to the communication device 112 and the memory device 116. The processing device 114 uses the communication device 112 to communicate with the network and other devices on the network. As such, the communication device 112 generally comprises a modem, antennae, WiFi or Ethernet adapter, radio transceiver, or other device for communicating with other devices on the network.

The memory device 116 comprises computer-readable instructions 120 and data storage 118, where the data storage 118 may comprise a copy of the distributed register 122. The distributed register (and the copy of the distributed register 122) may comprise a series of data records relevant to the objectives of an entity associated with the distributed network 104. For instance, the distributed register may comprise a series of data records which may contain data and/or metadata associated with one or more users, where the users may be clients of the entity. In this regard, the computer-readable instructions 120 may have a distributed register application 124 stored thereon, where the distributed register application 124 may allow the first node 101 to read data from the distributed register, submit data records to the distributed register, contribute to the consensus mechanism, or the like.

As further illustrated in FIG. 1, the second node 102 may also be a part of the distributed network 104 and comprise a communication device 132, a processing device 134, and a memory device 136. The second node 102 may, in some embodiments, be a general purpose node which hosts a copy of the distributed register 122. In other embodiments, in addition to being a general purpose node, the second node 102 may be a specialized node which may serve certain specialized functions with respect to the distributed register. For example, the second node 102 may be a node that establishes communication link with different data sources (e.g., other distributed register networks, social media, Internet of Things (IoT) devices, or the like) to gather information associated with users of the distributed register network. In such embodiments, the second node 102 may maintain separate files comprising user information for each of the users.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 132, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

The processing device 134 is operatively coupled to the communication device 132 and the memory device 136. The processing device 134 uses the communication device 132 to communicate with the network and other devices on the network, such as, but not limited to the first node 101 and/or the $n^{th}$ node 103. The communication device 132 generally comprises a modem, antennae, WiFi or Ethernet adapter, radio transceiver, or other device for communicating with other devices on the network.

In some embodiments, the memory device 136 may further include data storage 138 which may comprise a copy of the distributed register 12. The memory device 136 may have computer-readable instructions 140 stored thereon, which may further comprise the distributed register application 124.

As further illustrated in FIG. 1, the $n^{th}$ node 103 may be a part of the distributed network 104 and comprise a processing device 154 operatively coupled to a communication device 152 and a memory device 156. The memory device 156 may comprise data storage 158 having a copy of the distributed register 122 stored thereon. The memory device 156 may further comprise computer readable instructions 160 of the distributed register application 124.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the $n^{th}$ node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary distributed register that are generated by the system of the present invention, in accordance with one embodiment of the present disclosure. In particular, FIG. 2 depicts a plurality of blocks 200, 201 within the linked block ledger 122, in addition to a pending block 202 that has been submitted to be appended to the linked block ledger 122. The linked block ledger 122 may comprise a genesis block 200 that serves as the first block and origin for subsequent blocks in the linked block ledger 122. The genesis block 200, like all other blocks within the linked block ledger 122, comprise a block header 201 and block data 209. The genesis block data 209, or any other instances of block data within the linked block ledger 122 (or any other distributed ledger) may contain one or more data records. For instance, block data may comprise software source code, authentication data, transaction data, documents or other data containers, third party information, regulatory and/or legal data, or the like.

The genesis block 200 may comprise an original token 207 and a user token 208 that are associated with the verification of authenticity of the genesis block 200. The original token 207 may be the token that is generated by the first node as part of the authentication process described herein. In an exemplary embodiment, when a request (e.g., a transaction request, data storage request) is initiated by a user, the system may create the genesis block 200 for the transaction and may generate the original token 207 using a cryptographic hash algorithm to authenticate the user and to thereby verify the authenticity of the genesis block 200. After generating the original token 207, the first node may be responsible for transmitting the original token 207 to a registered user device of the user. The user after receiving the original token 207, may submit it to the system via a user interface that is provided to users for submitting requests. In response to receiving a user token 208 from the user via the user interface, the system compares the user token 208 with the original token 207. Upon determining that the user token 208 matches with the original token 207, the system marks the genesis block 200 as active and authentic. The system also saves the original token 207 and the user token in the genesis block 200. This process of verifying the authenticity of the blocks is explained in detail in FIG. 3.

The genesis block 200 may further comprise identified user data 206, where the identified user data 206 is associated with the real-time user information associated with a user initiating a request (e.g., a transaction request, data storage request, or the like). The real-time user information may be any information associated with the user device used to initiate the user request, information associated with patterns followed by the user before submitting the request, information associated with a an application stored on the user device (e.g., web application and user cookies in the web application). The system of the present invention may further authenticate the user based on the real-time user information gathered by the system and user information existing in a data warehouse (e.g., data file associated with the user which is gathered by the second node 102)

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the linked block ledger 122. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 211 of the genesis block 200. In this way, the block pointer 212 may be used to identify the previous block (e.g., the genesis block 200) in the linked block ledger 122, thereby creating a "chain" comprising the genesis block 200 and the subsequent block 201. The block 201 also comprises an original token 217, a user token 218, and identified user data 216 that are associated with the verification of authenticity of the block 201. In some embodiments, where the same user is associated with creating the block, the identified user data 216 may be compared with identified user data 206 of the genesis block 200 and/or the user information associated with the user to verify the authenticity of the block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the linked block ledger 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the linked block ledger 122. A pending block timestamp 224 may also be added to signify the time at which the pending block 202 is added to the linked block ledger 122. The pending block 202 also comprises an original token 227, a user token 228, and identified user data 226 that are associated with the verification of authenticity of the pending block 202.

In other embodiments, the consensus mechanism may be based on a total number of consensus responses submitted by the nodes of the linked block ledger 122, e.g., a PBFT consensus mechanism. Once a threshold number of consensus responses to validate the pending block 202 has been reached, the pending block 202 may be appended to the linked block ledger 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 is a flow diagram illustrating a process for authenticating users associated with blocks created in a distributed register, in accordance with one embodiment of the present disclosure. As shown in block 310, the system receives a request from a user, via a user interface. In some embodiments, the user interface is provided by the system of the present invention. In some embodiments, the request may be initiated at a node (e.g., second node 102) of the distributed register network. In some embodiments, the request may be a transaction request. In some embodiments, the request may be a data storage request.

As shown in block 302, the system in response to receiving the request, triggers creation of a block in a linked structure of the distributed register network. In some embodiments, the system may be a node of the distributed register network. In such embodiments, the system may automatically create a block in the linked structure of the distributed register network. In some embodiments, a different node of the distributed register network may be responsible for creating the block in the linked structure. In such an embodiment, the system may trigger the process of creation of the block in the linked structure.

As shown in block 303, the system generates an original token/key using a cryptographic hash algorithm and transmits the original token to the user. In some embodiments, the cryptographic hash algorithm may be a SHA-1 algorithm. In some embodiments, the system may use any other cryptographic hash algorithms to generate the original token. In some embodiments, the original token is a single use key. In some embodiments, the original token generated by the system may have a time limit, where upon elapse of the time limit, the original token will be expired. In such embodiments, the system may generate a new original token and transmit it to the user. In some embodiments, the system may transmit the original token to a registered user device as an SMS message. In some embodiments, the system may transmit the original token to a user device as a prompt. In some embodiments, the system may transmit the original token to an email of a user.

As shown in block 304, the system authenticates the user based on the original token. The system receives a user token from the user, via the user interface and compares the user token with the original token to determine a match. The user interface may be the same user interface that the user uses to submit the request as discussed in block 301.

As shown in block 305, the system determines if the authentication is successful. The system determines that the authentication is successful based on determining that the user token matches the original token. The system determines that the authentication is unsuccessful based in determining the user token does not match the original token.

If the authentication is unsuccessful, the process flow proceeds to block 310, where the system marks the block as a passive block/inactive block. The system marks the block as an inactive block and transmits the hash of the inactive block as a passive block to other nodes of the distributed register network. The system, in response to identifying the block as an inactive block does not delete the block from the distributed register network in order to maintain the integrity of the distributed register network.

If the authentication is successful, the process flow proceeds to block 306, where the system identifies real-time user information associated with the user. As discussed previously, the real-time user information comprises at least one of information associated with the user device used to initiate the user request, information associated with patterns followed by the user before submitting the request, information associated with an application stored on the user device (e.g., web application and user cookies in the web application). For example, the system may retrieve cookies from the web application stored on the user device of the user to authenticate the user, where the cookies may comprise previous historical activity of the user. In one example, the historical activity may be associated with social media.

Social media described herein may be associated with a private internal social media that is specific to an organization.

As shown in block 307, the system then authenticates the user based on comparing the real-time user information with the user information stored in a data warehouse. The data warehouse may comprise data files associated with all the users of the distributed register network, where the data files are generated by the system based on gathering data from one or more data sources (e.g., historical distributed register network, previous blocks in the current distributed register, social media, Internet of Things (IoT) devices, or the like). Continuing with the previous example, the system may compare the cookies extracted from the user device to the user information stored in the data file of the user. In one example, the system may compare device identifier of the user device with device identifier present in the data file of the user. In another example, the system may compare patterns (e.g., browsing data, user typing in passwords, number of attempts to login, user logging into an application 'X', or the like) associated with user activity existing in the data file of the user. The system may use any combination of user information present in the data file to authenticate the user. The system in response to comparing the real-time user information with the user information stored in the data warehouse, generates an authentication score.

As shown in block 308, the system may determine whether the authentication is successful or not based on the authentication score. In the case where the authentication score passes a predetermined threshold, the system may determine that the authentication is successful and the process flow proceeds to block 309 where the system marks the block as an active block. The system marks the block as an active block and performs validation of the block with other nodes of the distributed register network. In the case where the authentication score does not meet the predetermined threshold, the system may determine that the authentication is not successful and the process flow proceeds to block 310, where the system marks the block as a passive block/inactive block. The system marks the block as an inactive block and transmits the hash of the inactive block as a passive block to other nodes of the distributed register network. The system, in response to identifying the block as an inactive block does not delete the block from the distributed register network in order to maintain the integrity of the distributed register network.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for identifying unauthorized users in a distributed register network, the system comprising:
   a memory device with computer-readable program code stored thereon;
   a communication device; and
   a processing device operatively coupled to the memory device and the communication device, wherein the processing device is configured to execute the computer-readable program code to:
      receive a request from a user, via a user interface;
      in response to receiving the request from the user, trigger creation of a block in a linked structure of the distributed register network;
      generate an original token using a cryptographic hash algorithm;
      transmit the original token to the user;
      perform first level of authentication of the user based on the original token;
      determine that the first level of authentication is successful and perform a second level of authentication, wherein the second level of authentication comprises:
         identifying real-time information associated with the user; and
         comparing the real-time information of the user with user information stored in a data file associated with the user;
      determine that the second level of authentication is successful;
      in response to determining that the second level of authentication is successful, mark the block as an active block; and
      perform verification of the block with other nodes of the distributed register network.

2. The system according to claim 1, wherein the processing device is further configured to execute the computer-readable program code to:
   determine that at least one of the first level of authentication and the second level of authentication is unsuccessful;
   mark the block as a passive block based on determining that the first level of authentication or the second level of authentication is unsuccessful; and
   in response to marking the block as the passive block, transfer a hash of the block to the other nodes of the distributed register network.

3. The system according to claim 1, wherein performing the first level of authentication of the user comprises:
   receiving a user token from the user, via the user interface; and
   comparing the user token with the original token to determine a match between the user token and the original token.

4. The system according to claim 3, wherein the processing device is further configured to execute the computer-readable program code to store the original token and the user token in the block.

5. The system according to claim 1, wherein the request is received from a node of the distributed register network.

6. The system according to claim 1, wherein the user information in the data file is extracted from one or more data sources comprising at least one of historical distributed register networks, historical block in the distributed register network, internal private networking platform, and Internet of Things (IoT) devices.

7. The system according to claim 1, wherein the processing device is configured to determine that the second level of authentication is successful based on:
   generating an authentication score based on comparing the real-time information of the user with the user information stored in the data file; and
   determining that the authentication score meet a threshold limit.

8. A computer program product identifying unauthorized users in a distributed register network, the computer program product comprising at least one non-transitory computer readable medium having computer-readable program code portions embodied therein, the computer-readable program code portions comprising executable portions for:
   receiving a request from a user, via a user interface;
   in response to receiving the request from the user, triggering creation of a block in a linked structure of the distributed register network;
   generating an original token using a cryptographic hash algorithm;
   transmitting the original token to the user;
   performing first level of authentication of the user based on the original token;
   determining that the first level of authentication is successful and perform a second level of authentication, wherein the second level of authentication comprises:
      identifying real-time information associated with the user; and
      comparing the real-time information of the user with user information stored in a data file associated with the user;
   determining that the second level of authentication is successful;
   in response to determining that the second level of authentication is successful, marking the block as an active block; and performing verification of the block with other nodes of the distributed register network.

9. The computer program product of claim 8, wherein the computer-readable program code portions comprising executable portions for:
   determining that at least one of the first level of authentication and the second level of authentication is unsuccessful;
   marking the block as a passive block based on determining that the first level of authentication or the second level of authentication is unsuccessful; and
   in response to marking the block as the passive block, transferring a hash of the block to the other nodes of the distributed register network.

10. The computer program product of claim 8, wherein performing the first level of authentication of the user comprises:
   receiving a user token from the user, via the user interface; and
   comparing the user token with the original token to determine a match between the user token and the original token.

11. The computer program product of claim 10, wherein the computer-readable program code portions comprising executable portions for storing the original token and the user token in the block.

12. The computer program product of claim 8, wherein the user information in the data file is extracted from one or more data sources comprising at least one of historical distributed register networks, historical block in the distributed register network, internal private networking platform, and Internet of Things (IoT) devices.

13. The computer program product of claim 8, wherein determining that the second level of authentication is successful comprises:
   generating an authentication score based on comparing the real-time information of the user with the user information stored in the data file; and
   determining that the authentication score meet a threshold limit.

14. A computer-implemented method for identifying unauthorized users in a distributed register network, the method comprising:
   receiving a request from a user, via a user interface;
   in response to receiving the request from the user, triggering creation of a block in a linked structure of the distributed register network;
   generating an original token using a cryptographic hash algorithm;
   transmitting the original token to the user;
   performing first level of authentication of the user based on the original token;
   determining that the first level of authentication is successful and perform a second level of authentication, wherein the second level of authentication comprises:
      identifying real-time information associated with the user; and
      comparing the real-time information of the user with user information stored in a data file associated with the user;
   determining that the second level of authentication is successful;
   in response to determining that the second level of authentication is successful, marking the block as an active block; and
   performing verification of the block with other nodes of the distributed register network.

15. The computer-implemented method of claim 14, wherein the method further comprises:
   determining that at least one of the first level of authentication and the second level of authentication is unsuccessful;
   marking the block as a passive block based on determining that the first level of authentication or the second level of authentication is unsuccessful; and
   in response to marking the block as the passive block, transferring a hash of the block to the other nodes of the distributed register network.

16. The computer-implemented method of claim 14, wherein performing the first level of authentication of the user comprises:
   receiving a user token from the user, via the user interface; and
   comparing the user token with the original token to determine a match between the user token and the original token.

17. The computer-implemented method of claim 16, wherein the method further comprises storing the original token and the user token in the block.

18. The computer-implemented method of claim 14, wherein the request is received from a node of the distributed register network.

19. The computer-implemented method of claim 14, wherein the user information in the data file is extracted from one or more data sources comprising at least one of historical distributed register networks, historical block in the distributed register network, internal private networking platform, and Internet of Things (IoT) devices.

20. The computer-implemented method of claim 14, wherein determining that the second level of authentication is successful comprises:
   generating an authentication score based on comparing the real-time information of the user with the user information stored in the data file; and
   determining that the authentication score meet a threshold limit.

* * * * *